US011333952B2

(12) United States Patent
Qiu et al.

(10) Patent No.: US 11,333,952 B2
(45) Date of Patent: May 17, 2022

(54) CAMERA ASSEMBLY AND ELECTRONIC DEVICE

(71) Applicant: GUANGDONG OPPO MOBILE TELECOMMUNICATIONS CORP., LTD., Guangdong (CN)

(72) Inventors: Zeshuo Qiu, Guangdong (CN); Yu Jiang, Guangdong (CN); Jing Yang, Guangdong (CN); Qianqiang Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 330 days.

(21) Appl. No.: 16/693,340

(22) Filed: Nov. 24, 2019

(65) Prior Publication Data
US 2020/0096837 A1 Mar. 26, 2020

Related U.S. Application Data

(63) Continuation of application No. PCT/CN2018/087137, filed on May 16, 2018.

(30) Foreign Application Priority Data

May 27, 2017 (CN) .......................... 201710395462.1

(51) Int. Cl.
| H04M 1/02 | (2006.01) |
| G03B 15/05 | (2021.01) |
| H04M 1/04 | (2006.01) |

(52) U.S. Cl.
CPC .......... *G03B 15/05* (2013.01); *H04M 1/0264* (2013.01); *G03B 2215/0532* (2013.01); *H04M 1/04* (2013.01)

(58) Field of Classification Search
CPC .................. H04M 1/0264; H04M 1/04; G03B 2215/0532; G03B 2215/0589;
(Continued)

(56) References Cited

U.S. PATENT DOCUMENTS

2009/0161215 A1* 6/2009 Chan ...................... G03B 17/00
359/511
2010/0157141 A1* 6/2010 Ouyang ............... H04N 5/2251
348/371

(Continued)

FOREIGN PATENT DOCUMENTS

| CN | 101997942 | 3/2011 |
| CN | 102681304 | 9/2012 |

(Continued)

OTHER PUBLICATIONS

IPI, Office Action for IN Application No. 201917048810, dated Dec. 18, 2020.

(Continued)

*Primary Examiner* — Nelson D. Hernández Hernández
(74) *Attorney, Agent, or Firm* — Hodgson Russ LLP

(57) ABSTRACT

The present disclosure provides a camera assembly. The camera assembly includes a camera subassembly, a flash subassembly, a composite plate, and an annular light shielding member. The camera subassembly includes a camera. The flash subassembly includes a flash. The composite plate covers the camera subassembly and the flash subassembly. The composite plate is provided with a first hole enabling ambient lights to pass through the first hole and reach the camera subassembly. The composite plate is provided with a second hole enabling lights emitted from the flash to pass through the second hole and reach outside. The annular light shielding member is disposed on an internal wall of the first hole. The annular light shielding member is configured to (Continued)

prevent the lights emitted from the flash from reaching the camera.

18 Claims, 8 Drawing Sheets

(58) Field of Classification Search
CPC ...... G03B 17/56; G03B 11/043; G03B 15/06; G03B 15/03; G03B 15/05; H04N 5/2251; H04N 5/2256; H04N 5/2257
See application file for complete search history.

(56) References Cited

U.S. PATENT DOCUMENTS

| | | | |
|---|---|---|---|
| 2011/0050986 A1* | 3/2011 | Wang | G06F 1/1613 348/371 |
| 2011/0255000 A1 | 10/2011 | Weber et al. | |
| 2011/0315579 A1* | 12/2011 | Mase | H04M 1/0264 206/316.2 |
| 2013/0314582 A1* | 11/2013 | Masser | H04N 5/2256 348/340 |
| 2015/0168807 A1 | 6/2015 | Chao | |

FOREIGN PATENT DOCUMENTS

| | | | |
|---|---|---|---|
| CN | 202998185 U | * | 6/2013 |
| CN | 104506760 | | 4/2015 |
| CN | 105518523 | | 4/2016 |
| CN | 206023923 | | 3/2017 |
| CN | 206096718 | | 4/2017 |
| CN | 107037665 | | 8/2017 |

OTHER PUBLICATIONS

WIPO, ISR for PCT/CN2018/087137, dated Jul. 18, 2018.
EPO, Office Action for EP Application No. 18810203.2, dated May 7, 2020.

* cited by examiner

CAMERA ASSEMBLY AND ELECTRONIC DEVICE

CROSS-REFERENCE TO RELATED APPLICATIONS

This application is a continuation of International Application No. PCT/CN2018/087137, filed on May 16, 2018, which claims priority to Chinese Patent Application No. 201710395462.1, filed on May 27, 2017. The entire disclosures of the aforementioned applications are incorporated herein by reference.

TECHNICAL FIELD

The present disclosure relates to the technology field of electronic devices, and more particularly to a camera assembly and an electronic device.

BACKGROUND

At present, a rear wall of a mobile phone is generally provided with a camera and a flash. In order to beautify the mobile phone, the camera and the flash are arranged side by side in the existing technical solution. However, by means of such arrangement, when taking photos and using the flash, since lights emitted from the flash are scattered, part of lights emitted from the flash can reach the camera. As a result, balance of lights reaching the camera and quality of photos taken are affected, and accordingly the user experience is poor.

SUMMARY

The present disclosure provides an image assembly and an electronic device.

In a first aspect, the present disclosure provides a camera assembly. The camera assembly includes a camera subassembly, a flash subassembly, a composite plate, and an annular light shielding member. The camera subassembly includes a camera. The flash subassembly includes a flash. The composite plate covers the camera subassembly and the flash subassembly. The composite plate defines a first hole enabling ambient lights to pass through the first hole and reach the camera subassembly. The composite plate further defines a second hole enabling lights emitted from the flash to pass through the second hole and reach outside. The annular light shielding member is disposed on an internal wall of the first hole and configured to prevent the lights emitted from the flash from reaching the camera.

In a second aspect, an electronic device is provided. The electronic device includes a camera assembly. The camera assembly includes a camera subassembly, a flash subassembly, a composite plate, and an annular light shielding member. The camera subassembly includes a camera. The flash subassembly includes a flash. The composite plate covers the camera subassembly and the flash subassembly. The composite plate defines a first hole enabling ambient lights to pass through the first hole and reach the camera subassembly. The composite plate further defines a second hole enabling lights emitted from the flash to pass through the second hole and reach outside. The annular light shielding member is disposed on an internal wall of the first hole and configured to prevent the lights emitted from the flash from reaching the camera.

In a third aspect, an electronic device is provided. The electronic device includes a camera subassembly, a flash subassembly, a composite plate, and an annular light shielding member. The composite plate covers the camera subassembly and the flash subassembly. The composite plate includes a first part enabling ambient lights to reach the camera subassembly and a second part enabling lights emitted from the flash subassembly to reach outside. The annular light shielding member is disposed against the first part to isolate the lights emitted from the flash assembly from reaching the camera assembly.

BRIEF DESCRIPTION OF THE DRAWINGS

To better illustrate the technical solutions of the present disclosure, the following descriptions will briefly illustrate the accompanying drawings used for describing embodiments. Obviously, the accompanying drawings described in the following merely illustrate some embodiments of the present disclosure. Those skilled in the art may obtain other accompanying drawings according to the described accompanying drawings without creative efforts.

DETAILED DESCRIPTION

Figure 1:
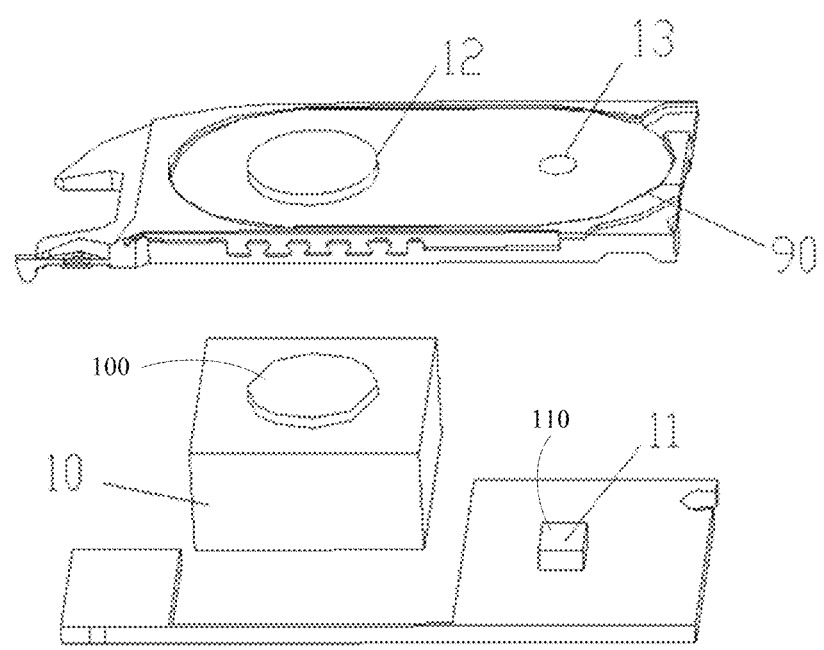
FIG. 1 is a schematic structural view of a camera assembly.

Technical solutions of embodiments of the present disclosure will be described clearly and completely in combination with the accompanying drawings of the embodiments of the present disclosure. Obviously, the described embodiments are merely a part rather than all embodiments of the present disclosure. All other embodiments obtained by those skilled in the art without creative efforts based on the embodiments of the present disclosure shall fall within the protection scope of the present disclosure.

It can be understood that, orientations or positional relationships indicated by terms "thickness", "left", "right", "top", "bottom" and so on in the specification are based on orientations or positional relationships illustrated in the accompany drawings, which are merely for the convenience of describing the present disclosure and simplifying the description, rather than imply or clearly indicate that devices or components indicated must have specific orientations and must be operated and constructed in particular orientations, and accordingly may not be regarded as limitations to the present disclosure.

The present disclosure provides a camera assembly. The camera assembly includes a camera subassembly, a flash subassembly, a composite plate, and an annular light shielding member. The camera subassembly includes a camera. The flash subassembly includes a flash. The composite plate covers the camera subassembly and the flash subassembly. The composite plate defines a first hole enabling ambient lights to pass through the first hole and reach the camera subassembly. The composite plate further defines a second hole enabling lights emitted from the flash to pass through the second hole and reach outside. The annular light shielding member is disposed on an internal wall of the first hole and configured to prevent the lights emitted from the flash from reaching the camera.

In a camera assembly provided in a first aspect, a first hole is provided with an annular platform at a bottom of the first hole. A bottom of the annular light shielding member is fixed to an upper surface of the annular platform.

In the camera assembly provided in the first aspect, the annular light shielding member is a metal ring.

In the camera assembly provided in the first aspect, an external wall or an internal wall of the annular light shielding member is provided with one of a plating layer or a painting layer.

In the camera assembly provided in the first aspect, the plating layer is selected from a group consisted of a chrome plating layer, a copper plating layer.

In the camera assembly provided in the first aspect, the camera assembly further includes a transparent shielding member fixed in the second hole.

In the camera assembly provided in the first aspect, the composite plate is further provided with a protective frame at a periphery of the composite plate.

In the camera assembly provided in the first aspect, the protective frame is provided with a painting layer.

In the camera assembly provided in the first aspect, the annular light shielding member is provided with a transparent cylinder. The transparent cylinder is disposed in an inner hole of the annular light shielding member.

In the camera assembly provided in the first aspect, the metal ring is selected from a group consisted of a closed metal ring and an unclosed metal ring.

In the camera assembly provided in the first aspect, the protective frame is provided with a painting layer at an external wall of the protective frame.

In the camera assembly provided in the first aspect, an external wall of the protective frame is provided with a layer selected from a group consisted of a chrome plating layer, a copper plating layer, or a gold plating layer.

In the camera assembly provided in the first aspect, a color of the painting layer is selected from a group consisted of black, gold, red, white, green, and rose gold.

In the camera assembly provided in the first aspect, the transparent shielding member includes a first cylinder and a second cylinder. The first cylinder and the second cylinder are coaxial. An external diameter of the first cylinder is larger than that of the second cylinder. The second cylinder is disposed in the second hole.

In the camera assembly provided in the first aspect, a hollow layer is disposed between the first hole and the second hole of the composite plate.

In the camera assembly provided in the first aspect, the hollow layer is provided with a concave lens.

In the camera assembly provided in the first aspect, the concave lens is concave lens groups.

In the camera assembly provided in the first aspect, the concave lens groups are distributed in array.

In the camera assembly provided in the first aspect, the annular platform defines a third hole. A diameter of the third hole is greater than an external diameter of the camera of the camera unit.

The present disclosure provides to an electronic device. The electronic device a camera subassembly, a flash subassembly, a composite plate, and an annular light shielding member. The composite plate covers the camera subassembly and the flash subassembly. The composite plate includes a first part enabling ambient lights to reach the camera subassembly and a second part enabling lights emitted from the flash subassembly to reach outside. The annular light shielding member is disposed against the first part to isolate the lights emitted from the flash assembly from reaching the camera assembly.

The present disclosure provides an electronic device. The electronic device includes a camera subassembly, a flash subassembly, a composite plate, and an annular light shielding member. The composite plate covers the camera subassembly and the flash subassembly. The composite plate includes a first part enabling ambient lights to reach the camera subassembly and a second part enabling lights emitted from the flash subassembly to reach outside. The annular light shielding member is disposed against the first part to isolate the lights emitted from the flash assembly from reaching the camera assembly.

FIG. 1 is a schematic structural view of a camera assembly disposed on a rear wall of a terminal. For convenience of description and understanding, only a part including a camera 100 and a flash 110 is illustrated in FIG. 1, and other parts of the terminal are not illustrated in FIG. 1.

Figure 2:
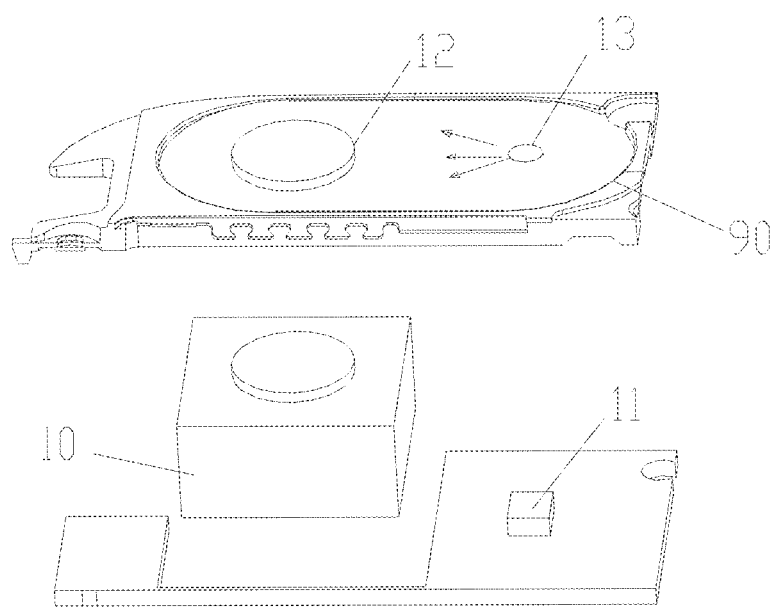
FIG. 2 is a schematic view illustrating lights emitted from a flash.

The camera assembly illustrated in FIG. 1 includes a camera subassembly 10, a flash subassembly 11, and a backplane 90. The backplane 90 defines a hole 12 corresponding to the camera subassembly 10 and a hole 13 corresponding to the flash subassembly. As illustrated in FIG. 1, the camera subassembly 10 of the camera assembly may pass through the hole 12. Lights emitted from an illuminator (such as a light-emitting diode (LED) or other illuminating members) of the flash subassembly 11 may pass through the hole 13 corresponding to the flash subassembly 11. To ensure shooting effect, the camera subassembly 11 of the camera subassembly 10 may extend through the hole 12 and extend out of the backplane 90, that is, the camera subassembly 10 is thicker than the backplane 90. However, the illuminator will not extend out of the hole 13, that is, the illuminator is flush with the backplane 90 in a thickness direction. The camera assembly is implemented as follows. In response to a command for shooting, a mobile phone may collect lights and determine whether to activate the flash subassembly 11 based on the lights collected. When the flash subassembly 11 needs to be activated, the flash subassembly 11 is activated to fill ambient lights before the camera subassembly 10 performs shooting. The camera subassembly 10 performs the shooting when illuminated by the current ambient lights. As illustrated in FIG. 1, the camera subassembly 10 is thicker than the illuminator. Due to characteristics of the flash 110, the lights (illustrated by the arrows in FIG. 2) emitted from the flash 110 are outwardly scattered. As illustrated in FIG. 2, when the illuminator illuminates, part of the scattered lights emitted from the flash 110 reaches the camera subassembly 10 and enters into the ambient lights, such that the lights for shooting are unbalanced, and the quality of shooting is affected. For example, white colors may occur in photos. In a severe case, overexposure may occur in photos. Thus, the user experience is affected.

Figure 3:
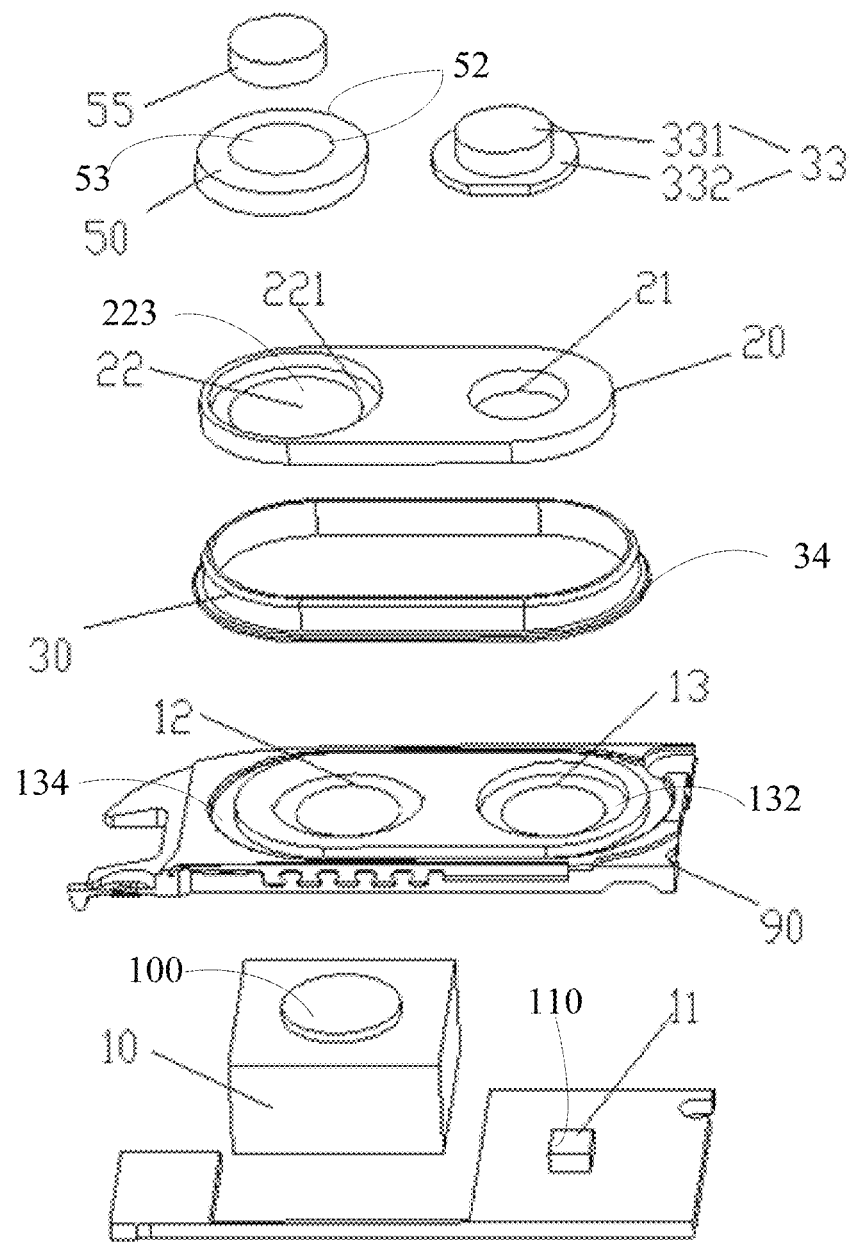
FIG. 3 is an exploded view of a camera assembly according to an embodiment of the present disclosure.
Figure 4:
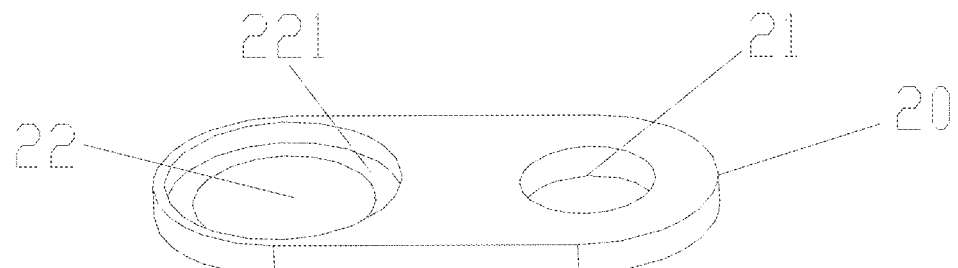
FIG. 4 is a schematic structural view of a composite plate according to an embodiment of the present disclosure.
Figure 7:
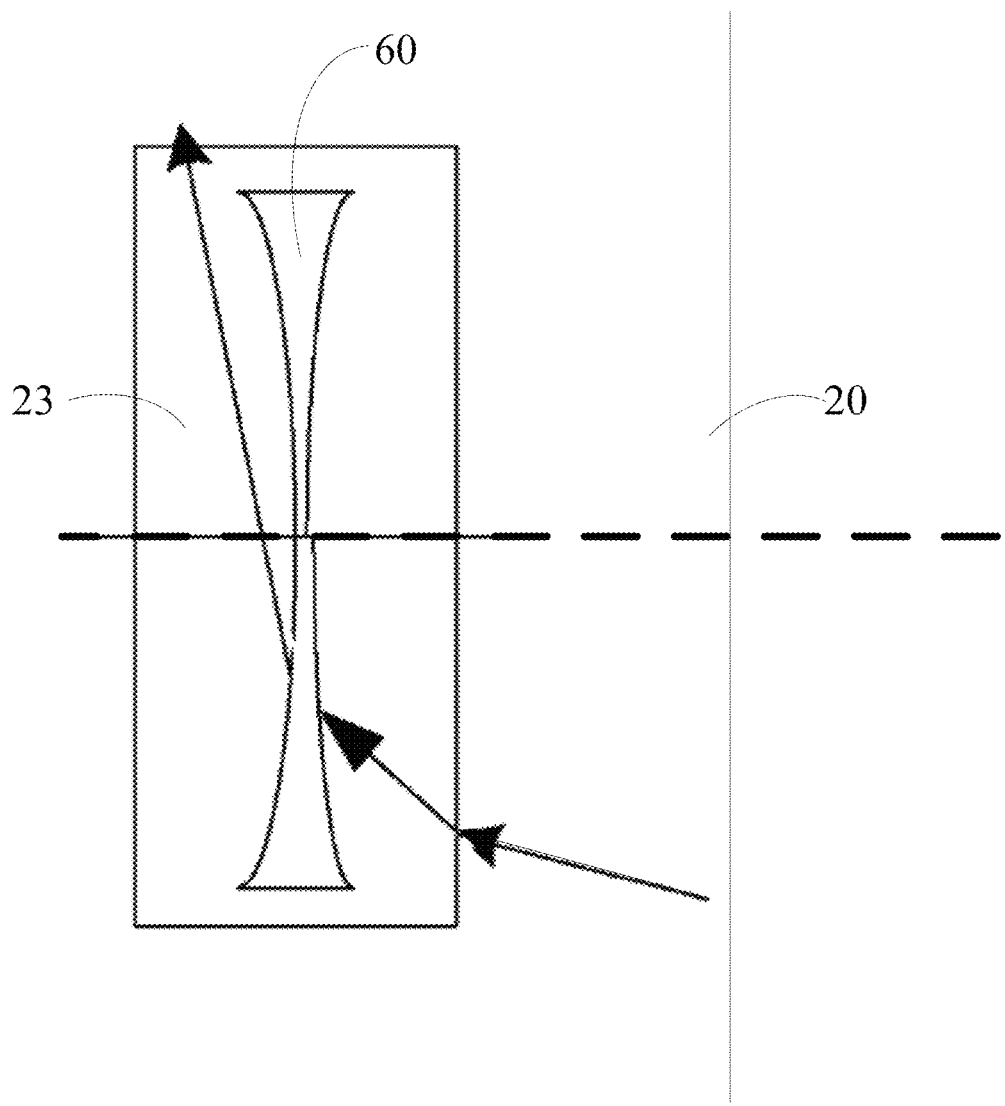
FIG. 7 is a schematic view illustrating lights passing through a concave lens according to an embodiment of the present disclosure.
Figure 8:
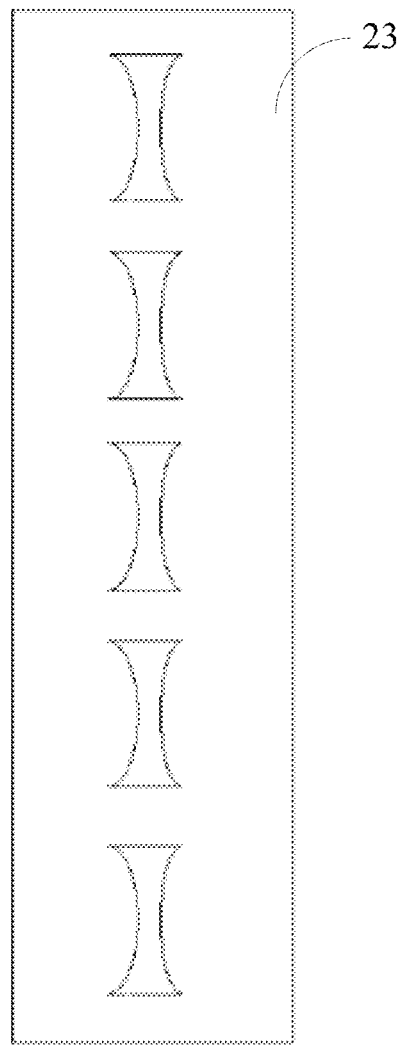
FIG. 8 is a schematic view illustrating concave lens groups distributed in array according to an embodiment of the present disclosure.

To prevent the flash 110 from affecting the camera subassembly 10, the embodiment of the present disclosure provides a camera assembly. As illustrated in FIG. 3 and FIG. 7, the camera assembly includes the camera subassembly 10, the flash subassembly 11, and the backplane 90. The backplane 90 is provided with the hole 12 corresponding to the camera subassembly 10 and the hole 13 corresponding to the flash subassembly 11. As illustrated in FIG. 4, the camera assembly may further include a composite plate 20 disposed above the camera subassembly 10 and the flash subassembly 11. The composite plate 20 covers the camera subassembly 10 and the flash subassembly 11, and allows lights to pass through. The composite plate 20 defines a first hole 22 (that is, the hole corresponding to the camera subassembly 10) and a second hole 21 (that is, the hole corresponding to the flash 110). A bottom of the first hole 22 is provided with an annular platform 221. The annular platform 221 defines a third hole 223. A diameter of the third hole 223 is larger than an external diameter of the camera 100 of the camera subassembly 10. A periphery of an internal wall of the first hole 22 is provided with an annular light shielding member 50, such as a metal ring. The annular light shielding member 50 is disposed on the internal wall of the first hole 22 and is configured to prevent lights from the flash 110 from reaching the camera 100. A bottom of the annular light shielding member 50 is fixed to an upper surface of the annular platform 221.

The annular light shielding member 50 is further provided with a transparent cylinder 55. The transparent cylinder 55 engages in an internal hole 53 defined in the annular light shielding member 50.

In an embodiment, as illustrated in FIG. 3, the composite plate 20 is further provided. The composite plate 20 is disposed above the camera subassembly 10 and the flash subassembly 11. In this way, the composite plate 20 can increase mechanical strength of the camera 100 and the flash 110. In addition, as illustrated in FIG. 2, the lights emitted from the flash 110 (as indicated by arrows) may be shielded by the annular light shielding member 50. As a result, the scattered lights emitted from the flash 110 may not reach the camera 100, balance of the lights reaching the camera subassembly 10 may not be affected. Furthermore, the bottom of the first hole 22 is provided with the annular platform 221 for fixing the annular light shielding member 50, and accordingly mechanical stability of the annular light shielding member 50 is increased. Since the annular light shielding member 50 is disposed between the inner wall of the first hole 22 defined in the composite plate 20 and the external wall of the camera 100 in the technical solution, a front of the flash 110 may not be blocked, and accordingly the scattering effect of the flash 110 is not affected. Therefore, the quality of photos taken is improved, without problems of overexposure and white colors.

The metal ring may be a closed ring in 360 degrees or an unclosed metal ring (that is, a ring with an opening). The closed ring in 360 degrees may shield in 360 degrees the lights emitted from the flash 110, and accordingly the quality of photos is further improved.

Figure 5:
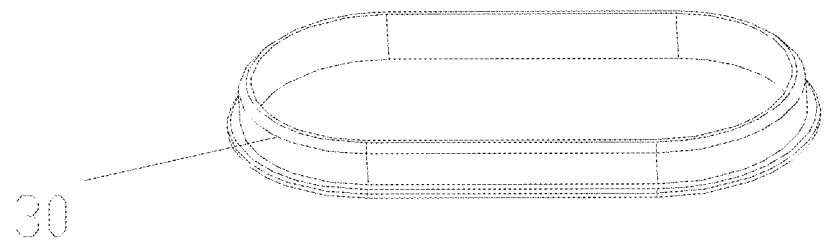
FIG. 5 is a schematic structural view of a protective frame according to an embodiment of the present disclosure.

As illustrated in FIG. 5, a periphery of the composite plate 20 is further provided with a protective frame 30. The protective frame 30 includes a fixing flange 34 extending outward from an exterior surface of the protective frame 30. As illustrated in FIG. 3, the backplane 90 further defines an annular fixing slot 134 surrounding the hole 12 and the hole 13. The fixing flange 34 may be fixed in the fixing slot 134. The protective frame 30 is used to protect the composite plate 20. When the terminal is dropped, the protective frame 30 is first subjected to forces, protecting the composite plate 20 from directly being exposed outside, and accordingly improving anti-fall ability of the composite plate 20.

An external wall of the protective frame 30 is provided with a painting layer. A color of the painting layer is consistent with a color of a backplane of the terminal. For example, the color may be selected from a group consisted of black, gold, red, white, green, rose gold, and the like.

When the composite plate 20 is provided with the second hole 21, the camera assembly may further include a transparent shielding member 33. The transparent shielding member 33 is fixed in the second hole 21. The transparent shielding member 33 is used to protect the flash 110 and prevent the flash 110 from being exposed outside, thereby improving anti-fall ability of the flash 110. The transparent shielding member 33 includes a first cylinder 332 and a second cylinder 331. The first cylinder 332 and the second cylinder 331 are coaxial. An external diameter of the first cylinder 332 is larger than that of the second cylinder 331. The second cylinder 331 may extend into the second hole 21. As illustrated in FIG. 3, an annular flange 132 extends from an internal wall of the hole 13 of the backplane 90, for supporting the first cylinder 332. Due to the first cylinder 332, a gap is defined between a lower surface of the composite plate 20 and the backplane of the terminal (such as an upper surface of the annular flange 132 of the backplane). A height of the gap is equal to a height of the first cylinder 332. In this way, a gap is also defined between the camera 100 and the lower surface of the composite plate 20. The gap defined between the camera 100 and the lower surface of the composite plate 20 provides a space for a zoom of the camera.

In an alternative embodiment, an external wall or an inner wall of the annular light shielding member 50 is provided with one of a plating layer 52 or a painting layer.

The plating layer 52 may be a metal plating layer selected from a group consisted of a chrome plating layer, a copper plating layer, a gold plating layer.

With the annular light shielding member 50 provided with the plating layer 52, the annular light shielding member 50 is beautified, and the appearance of the terminal and the user experience are improved.

Figure 6:
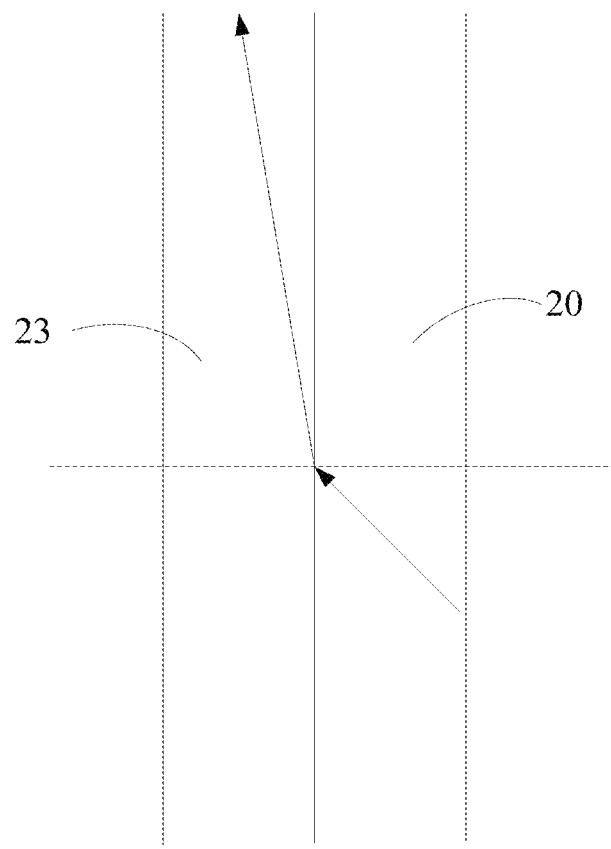
FIG. 6 is a schematic view illustrating lights passing through a hollow layer according to an embodiment of the present disclosure.

In an alternative embodiment, a hollow layer 23 is further defined in the composite plate 20 between the first hole 22 and the second hole 21 of the composite plate 20, as illustrated in FIG. 6 and FIG. 7. With the hollow layer 23, the scattered lights can be disperse to ambient environment. As illustrated in FIG. 6, since a refractive index of the composite plate 20 is greater than that of the air within the hollow layer 23, when the lights emitted from the flash 110 pass through the composite plate 20 and reach the hollow layer 23, part of the lights are refracted to the ambient environment due to light refraction. Accordingly, a function of the flash 110 is enhanced, and fill light effect of the flash 110 is improved.

In an alternative embodiment, the hollow layer 23 is provided with a concave lens 60. The concave lens 60 may be concave lens groups. In an alternative embodiment, the concave lens groups are distributed in array. As illustrated in FIG. 7, the lights passing through the composite plate 20 are scattered to the ambient by the concave lenses 60.

In an alternative embodiment, focus points of the concave lens groups are on a first straight line. The first straight line is collinear with a center line of the flash 110, and accordingly the scattering effect is further improved.

FIG. 4 is a block diagram illustrating a part of a structure of a mobile phone related to the electronic device provided in the embodiments of the present disclosure. As illustrated in FIG. 4, the mobile phone includes a radio frequency (RF) circuit 910, a memory 920, an input unit 930, a display unit 940, a sensor 950, an audio circuit 960, a Wireless Fidelity (Wi-Fi) unit 970, a processor 980, a power supply 990 and other components. Those skilled in the art should understand that, the structure of the mobile phone illustrated in FIG. 4 does not constitute any limitation to the mobile phone of the present disclosure. The structure can include more or fewer components, or some components can be combined, or components can be arranged in a different way.

Figure 9:
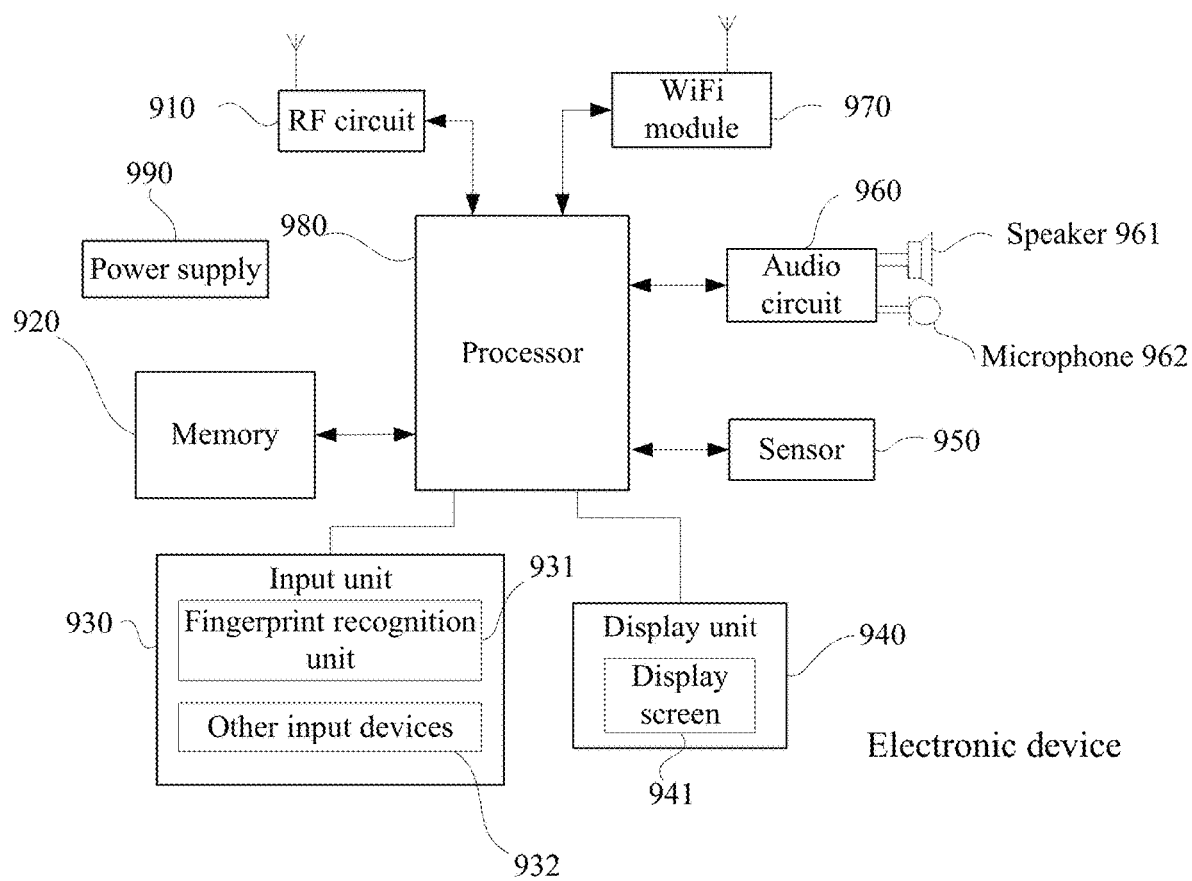
FIG. 9 is a schematic structural view of an electronic device according to an embodiment of the present disclosure.

Each component of the mobile phone will be specifically introduced below in combination with FIG. 9.

The RF circuit 910 may be configured for information transmission and information reception. In general, the RF circuit 910 includes, but not limited to, an antenna, at least one amplifier, a transceiver, a coupler, a low noise amplifier (LNA), a duplexer, and so on. In addition, the RF circuit 910 may also communicate with a network and other devices via wireless communication. The above wireless communication may support any communication standard or protocol, which includes, but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and so on.

The memory 920 may be configured to store software programs and modules. The processor 980 may be configured to execute various functional applications and data processing of the mobile phone via running software programs and modules stored in the memory 920. The memory 920 mainly includes a program storage area and a data storage area. The program storage area may store operating systems, an application required for at least one function, and so on. The data storage area may store data created according to usage of the mobile phone. In addition, the memory 920 may include a high-speed random access memory, and may further include a non-transitory storage device, such as at least one of a magnetic disk storage device, a flash memory device, or other transitory solid-state storage devices.

The input unit 930 may be configured to receive input numerical or character information, and generate key signal inputs related to user settings and function control of the mobile phone. The input unit 930 can include a fingerprint recognition unit 931 and other input devices 932. The fingerprint identification unit 931 can collect fingerprint data of a user. In addition to the fingerprint recognition unit 931, the input unit 930 can also include other input devices 932. Specifically, other input devices 932 may include, but are not limited to one or more of a touch screen, a physical key, a function key (such as a volume control key, a switch key, and so on), a trackball, a mouse, a joystick, and so on.

The display unit 940 may be configured to display information input by the user or information provided to the user as well as various menus of the mobile phone. The display unit 940 can include a display screen 941. For example, the display screen 941 can be configured in a form of a liquid crystal display (LCD), an organic light-emitting diode (OLED), and so on. In FIG. 4, the fingerprint recognition unit 931 and the display screen 941 are used as two independent components to implement the input and input functions of the mobile phone. However, in some embodiments, the fingerprint recognition unit 931 and the display screen 941 may be integrated to achieve the input and playback functions of the mobile phone.

The mobile phone may further include at least one sensor 950, such as a light sensor, a motion sensor, and other sensors. Specifically, the light sensor may include an ambient light sensor and a proximity sensor. The ambient light sensor may be configured to adjust the luminance of the display screen 941 according to the luminance of ambient light. The proximity sensor may be configured to turn off the display screen 941 and/or backlight when the mobile phone is approaching to the ear. As a kind of motion sensor, the accelerometer sensor can be configured to detect the acceleration in all directions (usually three axes), and can be configured to detect the magnitude and direction of gravity at rest. The accelerometer sensor can be configured to identify the gesture of the mobile phone (such as horizontal and vertical screen switching, related games, magnetometer attitude calibration), vibration identification related functions (such as pedometer, percussion), and so on. The mobile phone can also be provided with other sensors, such as a gyro-sensor, an air pressure sensor, a humidity sensor, a temperature sensor, an infrared sensor, and so on, and details are not described herein again.

An audio circuit 960, a speaker 961, and a microphone 962 provide audio interfaces between the user and the mobile phone. The audio circuit 960 may be configured to convert received audio data into an electrical signal, and transmit the electrical signal to the speaker 961, and then the electrical signal is converted into a sound signal for playing by the speaker 961. On the other hand, the microphone 962 is configured to convert collected sound signal into an electrical signal, which is received by the audio circuit 960 and then converted into an audio signal. The audio signal is played and processed by the processor 980, and then is sent to another mobile phone via the RF circuit 910, for example. Or, the audio data is stored in the memory 920 for subsequent processing.

Wi-Fi is a short-range wireless transmission technology. With the Wi-Fi module 970, the mobile phone can help users send and receive e-mail, browse the web, access streaming media, and so on, which provides the user with wireless broadband Internet access. Although the Wi-Fi module 970 is illustrated in FIG. 4, however, it should be understood that, the Wi-Fi module 970 is not a necessary component of the mobile phone, and can be omitted as needed without changing the essence of the disclosure.

The processor 980 is a control center for the mobile phone, it uses various interfaces and lines to connect various components of the mobile phone. The processor 980 is configured to perform various functions and process data of the mobile phone by running or executing software programs and/or modules stored in the memory 920, and invoke data stored in the memory 920, thereby achieve overall monitoring of the mobile phone. Alternatively, the processor 980 may include one or more processing units. As one implementation, the processor 980 may be integrated with an application processor and a modem processor. The application processor is mainly configured to deal with the operating system, user interface, application programs, and so on. The modem processor is mainly configured to deal with wireless communication. It should be noted that, the above-identified modem processor may also not be integrated into the processor 980.

The mobile phone further includes a power supply 990 (such as a battery) for powering various components. Preferably, the power supply can be logically connected to the processor 980 via a power management system, to manage charging, discharging, power management functions, and so on, through the power management system.

Although not illustrated, the mobile phone may further include the camera, the flash, and the camera assembly as illustrated in FIG. 2 or FIG. 3, and details are not described herein again.

The above is embodiments of the present disclosure. It should be noted that modifications and improvements may be made by the skill in art without departing the spirit of the present disclosure. The modifications and improvements are deemed within the protective scope of the present disclosure.

What is claimed is:

1. A camera assembly comprising:
    a camera subassembly comprising a camera;
    a flash subassembly comprising a flash;
    a composite plate covering the camera subassembly and the flash subassembly, wherein the composite plate defines a first hole enabling ambient lights to pass through the first hole and reach the camera subassembly, and wherein the composite plate defines a second hole enabling lights emitted from the flash to pass through the second hole and reach outside; and
    an annular light shielding member disposed on an internal wall of the first hole, wherein the annular light shielding member is configured to prevent the lights emitted from the flash from reaching the camera;
    wherein the composite plate is further provided with a protective frame at a periphery of the composite plate and the protective frame is provided with a painting layer.

2. The camera assembly of claim 1, wherein the first hole is provided with an annular platform at a bottom of the first hole, and wherein a bottom of the annular light shielding member is fixed to an upper surface of the annular platform.

3. The camera assembly of claim 2, wherein the annular platform defines a third hole, and wherein a diameter of the third hole is greater than an external diameter of the camera of the camera subassembly.

4. The camera assembly of claim 1, wherein the annular light shielding member is a metal ring.

5. The camera assembly of claim 4, wherein the annular light shielding member is provided with a transparent cylinder, and wherein the transparent cylinder is engaged in an inner hole of the annular light shielding member.

6. The camera assembly of claim 4, wherein the annular light shielding member is selected from a group consisted of a closed metal ring and an unclosed metal ring.

7. The camera assembly of claim 1, wherein an external wall or an internal wall of the annular light shielding member is provided with one of a plating layer or a painting layer.

8. The camera assembly of claim 7, wherein the plating layer is selected from a group consisted of a chrome plating layer, and a copper plating layer.

9. The camera assembly of claim 8, further comprising a transparent shielding member fixed in the second hole.

10. The camera assembly of claim 9, wherein the transparent shielding member comprises a first cylinder and a second cylinder, and wherein the first cylinder and the second cylinder are coaxial with each other, an external diameter of the first cylinder is larger than that of the second cylinder, and the second cylinder is disposed in the second hole.

11. The camera assembly of claim 1, wherein the protective frame is provided with a painting layer at an external wall of the protective frame.

12. The camera assembly of claim 1, wherein an external wall of the protective frame is provided with a plating layer selected from a group consisted of a chrome plating layer, a copper plating layer, or a gold plating layer.

13. The camera assembly of claim 1, further comprising a hollow layer disposed between the first hole and the second hole defined in the composite plate.

14. The camera assembly of claim 13, wherein the hollow layer is provided with a concave lens.

15. The camera assembly of claim 14, wherein the concave lens is a concave lens groups, and wherein the concave lens groups are distributed in array.

16. An electronic device comprising a camera assembly, the camera assembly comprising:
    a camera subassembly comprising a camera;
    a flash subassembly comprising a flash;
    a composite plate covering the camera subassembly and the flash subassembly, wherein the composite plate defines a first hole enabling ambient lights to pass through the first hole and reach the camera subassembly, and wherein the composite plate defines a second hole enabling lights emitted from the flash to pass through the second hole and reach outside; and
    an annular light shielding member disposed on an internal wall of the first hole, wherein the annular light shielding member is configured to prevent the lights emitted from the flash from reaching the camera;
    wherein the composite plate is further provided with a protective frame at a periphery of the composite plate and the protective frame is provided with a painting layer.

17. The electronic device of claim 16, wherein the camera assembly is disposed on a rear wall of the electronic device.

18. An electronic device comprising:
    a camera subassembly;
    a flash subassembly;
    a composite plate covering the camera subassembly and the flash subassembly, wherein the composite plate has a first part enabling ambient lights to reach the camera subassembly, and a second part enabling lights emitted from the flash subassembly to reach outside; and
    an annular light shielding member disposed against the first part to isolate the lights emitted from the flash subassembly from the camera subassembly;
    wherein the composite plate is further provided with a protective frame at a periphery of the composite plate and the protective frame is provided with a painting layer.

* * * * *